(12) United States Patent
Czachor et al.

(10) Patent No.: US 7,147,429 B2
(45) Date of Patent: Dec. 12, 2006

(54) TURBINE ASSEMBLY AND TURBINE SHROUD THEREFOR

(75) Inventors: Robert Paul Czachor, Cincinnati, OH (US); John Alan Manteiga, North Andover, MA (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 10/942,765

(22) Filed: Sep. 16, 2004

(65) Prior Publication Data

US 2006/0056961 A1    Mar. 16, 2006

(51) Int. Cl.
*F01B 25/16* (2006.01)

(52) U.S. Cl. ............... 415/9; 415/173.1; 415/173.4

(58) Field of Classification Search ............... 415/9, 415/138, 173.1, 173.4, 173.7, 241.1
See application file for complete search history.

(56) References Cited

U.S. PATENT DOCUMENTS

| | | | |
|---|---|---|---|
| 4,330,234 A * | 5/1982 | Colley | ............... 415/173.2 |
| 5,593,277 A | 1/1997 | Proctor et al. | |
| 5,971,703 A * | 10/1999 | Bouchard | ............... 415/135 |
| 6,120,242 A * | 9/2000 | Bonnoitt et al. | ............... 415/9 |
| 6,468,026 B1 | 10/2002 | Bonnoitt et al. | |
| 6,530,744 B1 | 3/2003 | Liotta et al. | |

* cited by examiner

Primary Examiner—Edward K. Look
Assistant Examiner—Dwayne J White
(74) Attorney, Agent, or Firm—Adams Evans P.A.; William Scott Andes

(57) ABSTRACT

A turbine assembly includes a shroud for being mounted around a last stage of the low pressure turbine rotor. The shroud includes an arcuate body having spaced-apart forward and aft ends and spaced-apart circumferential ends. Attachments are provided for securing the shroud body to the surrounding engine case. An arcuate extension member protrudes rearward from the aft end of the shroud body. The extension member has an inner surface which defines a portion of the gas flowpath through the engine. Seals may be provided to prevent leakage between adjacent shroud segments. The shroud is especially useful for protecting a downstream turbine frame from debris and thermal stress.

19 Claims, 6 Drawing Sheets

TURBINE ASSEMBLY AND TURBINE SHROUD THEREFOR

BACKGROUND OF THE INVENTION

This invention relates generally to gas turbine engines and more particularly to shroud for a turbine of such engines.

Gas turbine engines include one or more turbines which extract energy from a gas flow to produce mechanical work. It is common in the prior art for a structural exhaust frame or turbine rear frame ("TRF") to be disposed behind a low pressure turbine ("LPT"). Because of the configuration typically used, the transition between the structural case of the LPT and the structural case of the TRF must provide an inward-sloping diameter.

This inward slope from the LPT case to the TRF case creates a radial pocket with a forward axial boundary created by the shroud surrounding the last stage of LPT blades and an aft boundary created by the inward-sloping contour of the TRF case. In the event of a turbine failure in which debris is ejected aftward, this pocket can trap a quantity of the debris and prevent it from being ejected aft out the tailpipe of the engine. Entrapment of debris from a turbine failure in this fashion is highly undesirable, since damage could conceivably sever the engine carcass load path to the aft mount. This, in turn, could lead to engine component liberation and aircraft damage.

The presence of the inward-sloping frame case directly aft of the LPT exit blade tip seal is also subject to impingement of high-temperature leakage air which bypasses the blade across the tip seal teeth Since this cycle air has had no work extracted by the last LP stage, it will be significantly hotter than the remaining cycle air to which the TRF is exposed. It will also have higher impingement velocity and therefore heat transfer coefficient relative to the remainder of the LPT discharge flow. Locally, this can create adverse thermal gradients and thermal fatigue issues in the TRF case, in addition to overtemperature concerns. The radial transition also requires a length of conical structure aft of the shroud axial position, which adds length and weight to the engine.

Accordingly, there is a need for a turbine shroud arrangement which protects the TRF case from debris and high temperatures.

BRIEF SUMMARY OF THE INVENTION

The above-mentioned need is met by the present invention, which according to one aspect provides a turbine shroud for a gas turbine engine, including an arcuate body having spaced-apart forward and aft ends and spaced-apart circumferential ends; means for attaching the body to a surrounding case of the engine; and an arcuate extension member protruding rearward from the aft end of the body, the extension member having an inner surface adapted to define a portion of a gas flowpath through the engine.

According to another aspect of the invention, a turbine assembly includes a rotor which is rotatable about a longitudinal axis, the rotor carrying at least one stage comprising radially-extending turbine blades for interacting with a gas flow through the turbine; an annular first case, the first case having a first section which surrounds the turbine blades, and a second section disposed aft of the first section which defines a portion of a flowpath through the turbine; and a turbine shroud disposed between the first case and the blades. The turbine shroud includes an arcuate body having spaced-apart forward and aft ends and spaced-apart circumferential ends; and an arcuate extension member which protrudes rearward from the aft end of the body and extends from the aft end of the body to the second section of the first case, the extension member having an inner surface adapted to form a portion of a gas flowpath through the turbine.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
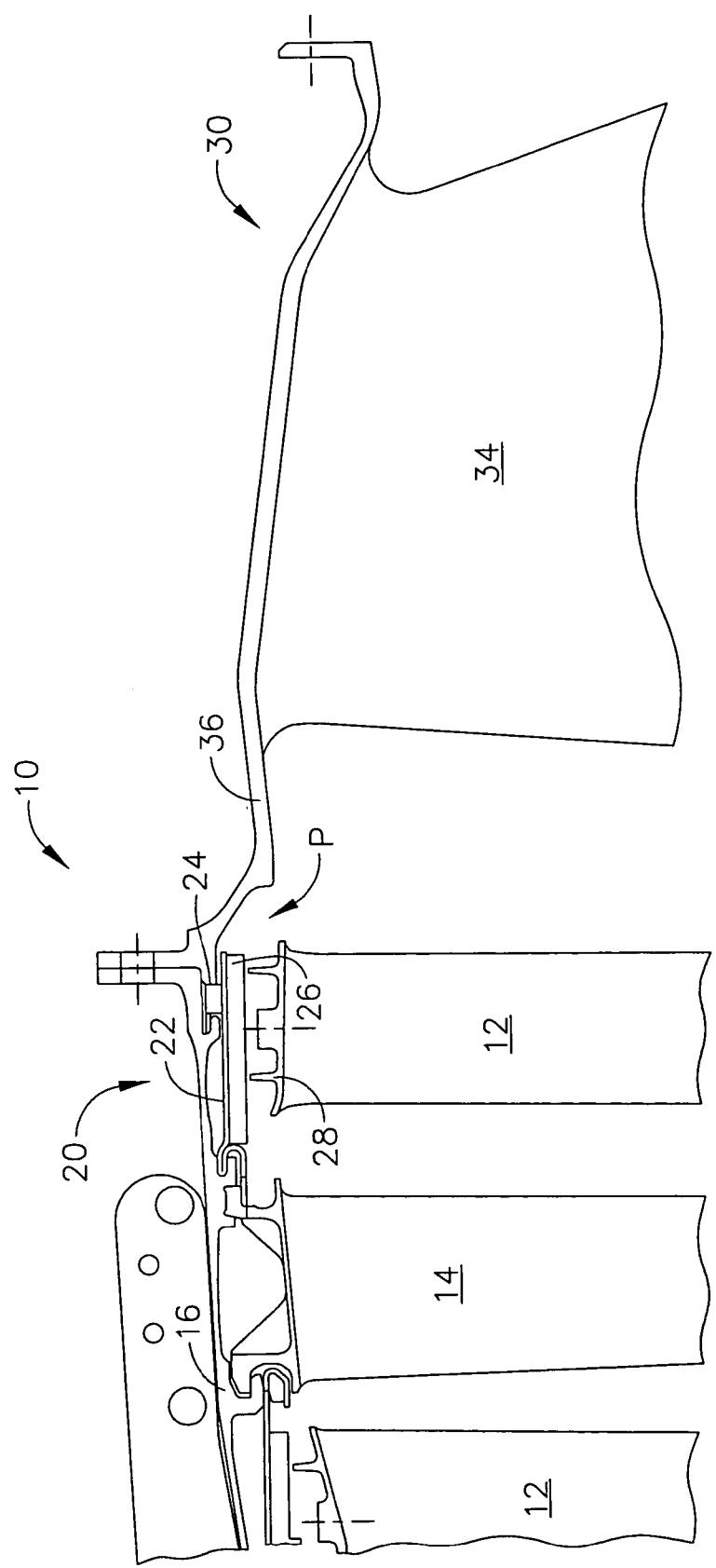
FIG. 1 is a schematic cross-sectional view of a prior art turbine section and shroud assembly.

Referring to the drawings wherein identical reference numerals denote the same elements throughout the various views, FIG. 1 illustrates a portion of a low-pressure turbine ("LPT") 10 of a prior art gas turbine engine. The LPT 10 includes alternating stages of turbine blades 12 and turbine nozzles or vanes 14. The turbine nozzles 14 are attached to an annular LPT case 16 which while the turbine blades 12 are attached to a rotor assembly (not shown) which cooperates with appropriate shafting to turn a compressor or other mechanical load. The aft end 20 of the LPT case 16 carries a circumferentially-extending turbine shroud 22. The purpose of the turbine shroud 22 is to provide a close-fitting seal between the LPT case 16 and the outer ends of the turbine blades 12, thus reducing flow losses in the LPT 10. The shroud 22 illustrated in FIG. 1 is typical of the prior art and comprises a ring of arcuate segments each including a base 24 that carries an abradable member 26. The abradable member 26 interacts with radially-outwardly-extending seal teeth 28 of the turbine blades 12 to provide the desired seal.

A stationary frame referred to as a turbine rear frame or "TRF" 30 comprises a central hub (not shown), a plurality of radially-extending arms 34, one of which is depicted in FIG. 1, and an annular TRF case 36 which is attached to the aft end 20 of the LPT case 16 immediately behind the last stage of turbine blades 12. The TRF case 36 defines the outer flowpath surface directly without any intermediate structure. A result of this construction is that the transition between the LPT case 16 and the TRF case 36 must provide an inward-sloping diameter because of the radial height required for the turbine shroud 22.

The inward slope from the LPT case 16 to the TRF case 36 necessarily occurs aft of the turbine shroud exit, creating a radial pocket "P" with a forward axial boundary created by the turbine shroud 22 and an aft boundary created by the inward-extending contour of the TRF case 36. In the event of a turbine failure in which debris are ejected aftward, this pocket P can trap a quantity of said debris and prevent it from being ejected aft out the tailpipe of the engine. The action of the remaining LPT blades can them serve to rotate this debris and cause further damage to the case in the pocket area. In some situations this condition may have the potential to sever the TRF case 36.

Figure 2:
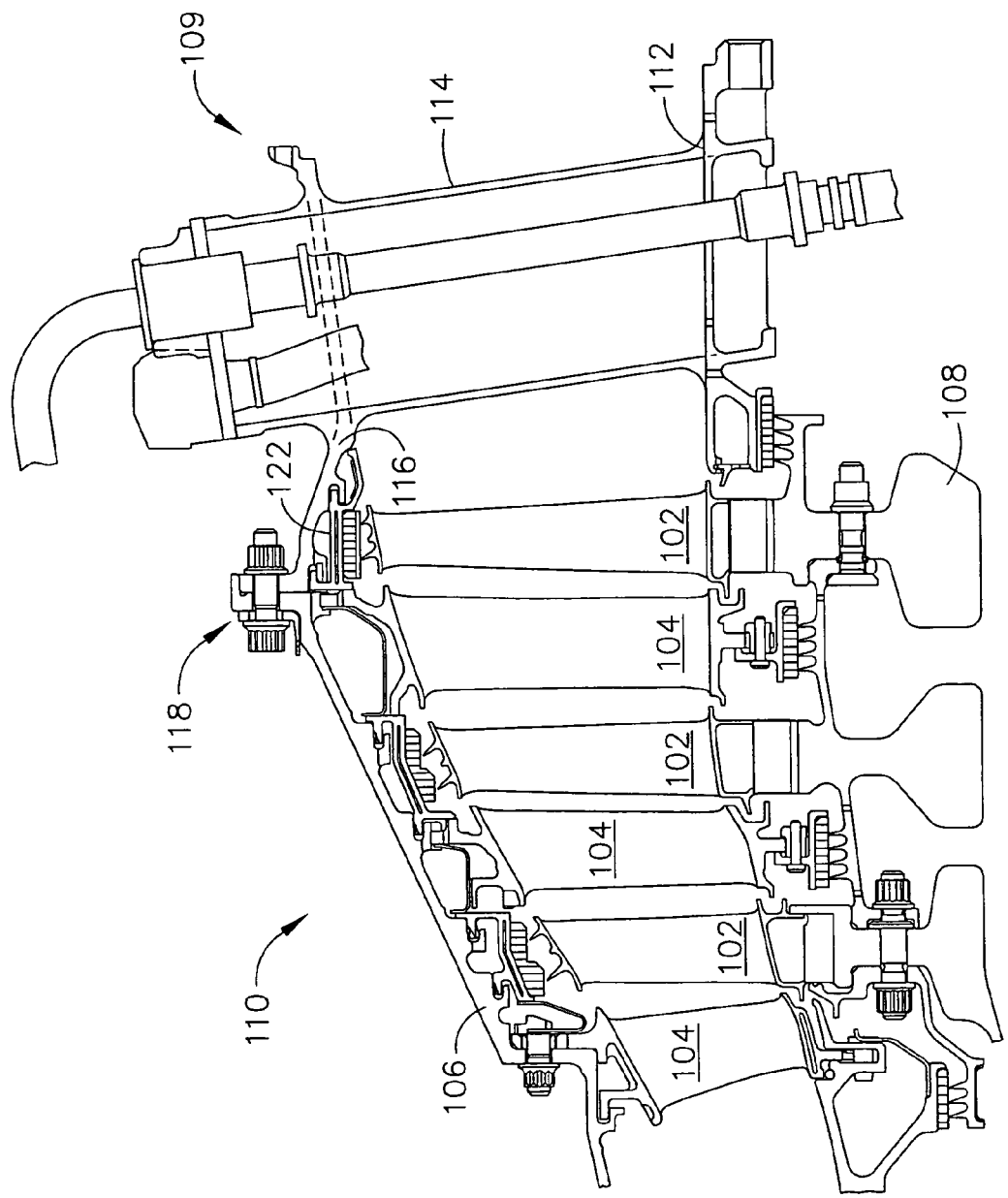
FIG. 2 is a schematic side view of a portion of a gas turbine engine showing a turbine shroud constructed according to an embodiment of the present invention.

FIG. 2 illustrates an exemplary low-pressure turbine ("LPT") 110 of a gas turbine engine constructed in accordance with an embodiment of the present invention. It should be noted that the present invention could also be implemented with other types of rotating machinery such as a high-pressure turbine or a compressor. The LPT 110 includes alternating stages of turbine blades 102 and turbine nozzles or vanes 104. The turbine nozzles 104 are attached to an annular LPT case 106 while the turbine blades 102 are attached to a rotor assembly 108 which cooperates with appropriate shafting to turn a compressor or other mechanical load (not shown).

A stationary turbine rear frame ("TRF") 109 comprises a hub 112, a plurality of radially-extending arms 114, one of which is depicted in FIG. 2, and an annular TRF case 116 which is attached to the aft end of the LPT case 106 at a joint 118. The joint 118, in this example a bolted flange joint, is made at a location longitudinally forward of the last stage of turbine blades 102. In this arrangement, there is still a transition from the larger-diameter LPT case 106 to the TRF case 116, as in the prior art LPT 10. However, this transition occurs outboard of the turbine shroud 122 (described below) in the TRF 109, thus eliminating the pocket P of the prior art design. There is, therefore, no geometry which can axially capture rotating debris in the event of a turbine failure and prevent its ejection aft from the engine.

Figure 3:
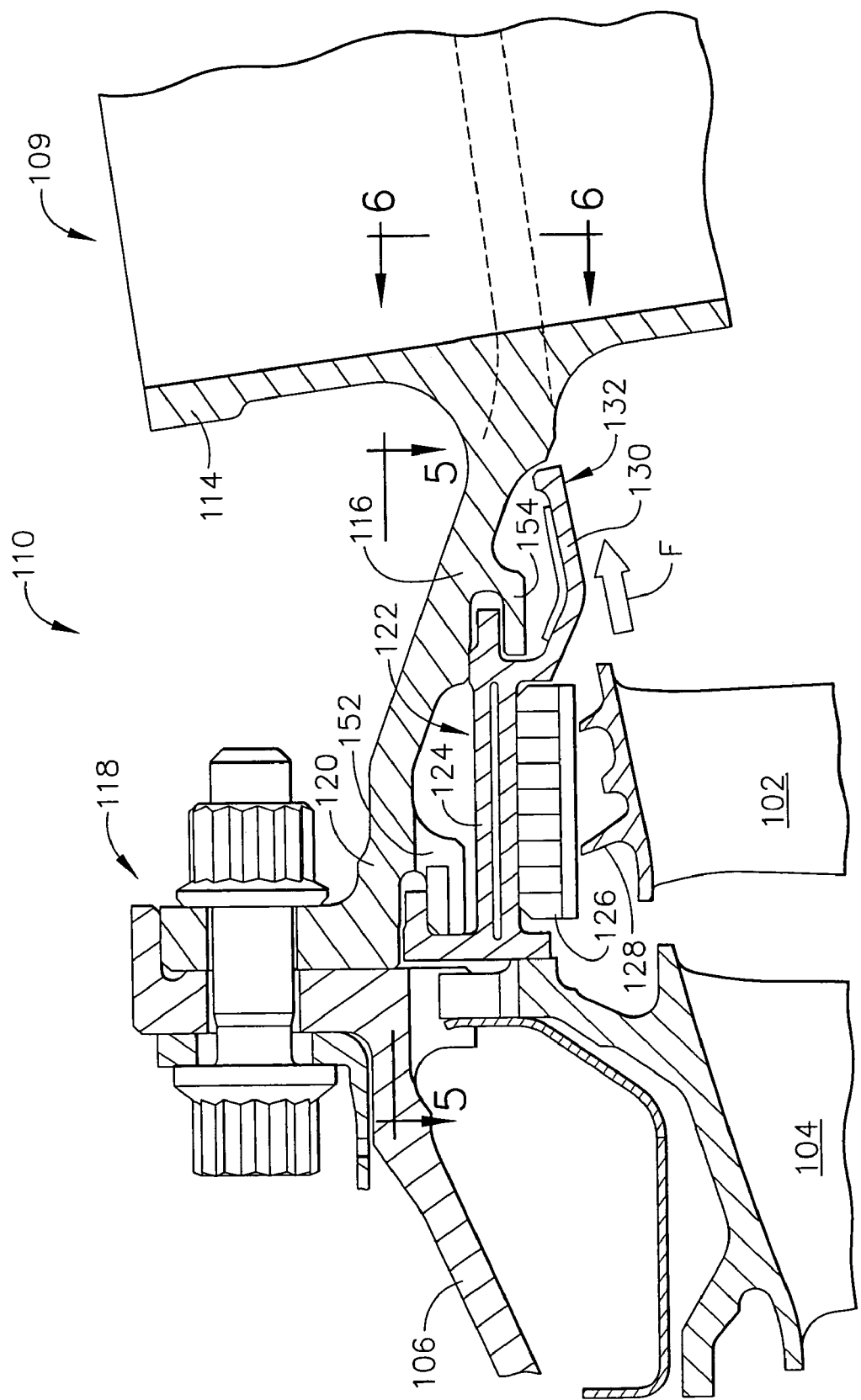
FIG. 3 is an enlarged view of a portion of the shroud assembly shown in FIG. 2.

As shown in FIG. 3, the forward end 120 of the TRF case 116 carries a circumferential turbine shroud 122. The shroud 122 includes a base 124 which spans the chord length of the turbine blades 102. The base 124 carries a stationary seal member 126 of a known type, for example an abradable honeycomb structure as shown. The seal member 126 interacts with radially-outwardly-extending seal teeth 128 of the turbine blades 102 to provide a seal which minimizes leakage flow past the outer ends of the turbine blades 102.

The shroud 122 also includes an aft-protruding extension member 130. Its inner surface 132 defines a transitional flowpath "F" between the radially outer end of the last stage of turbine blades 102 and the TRF case 116.

Figure 4:
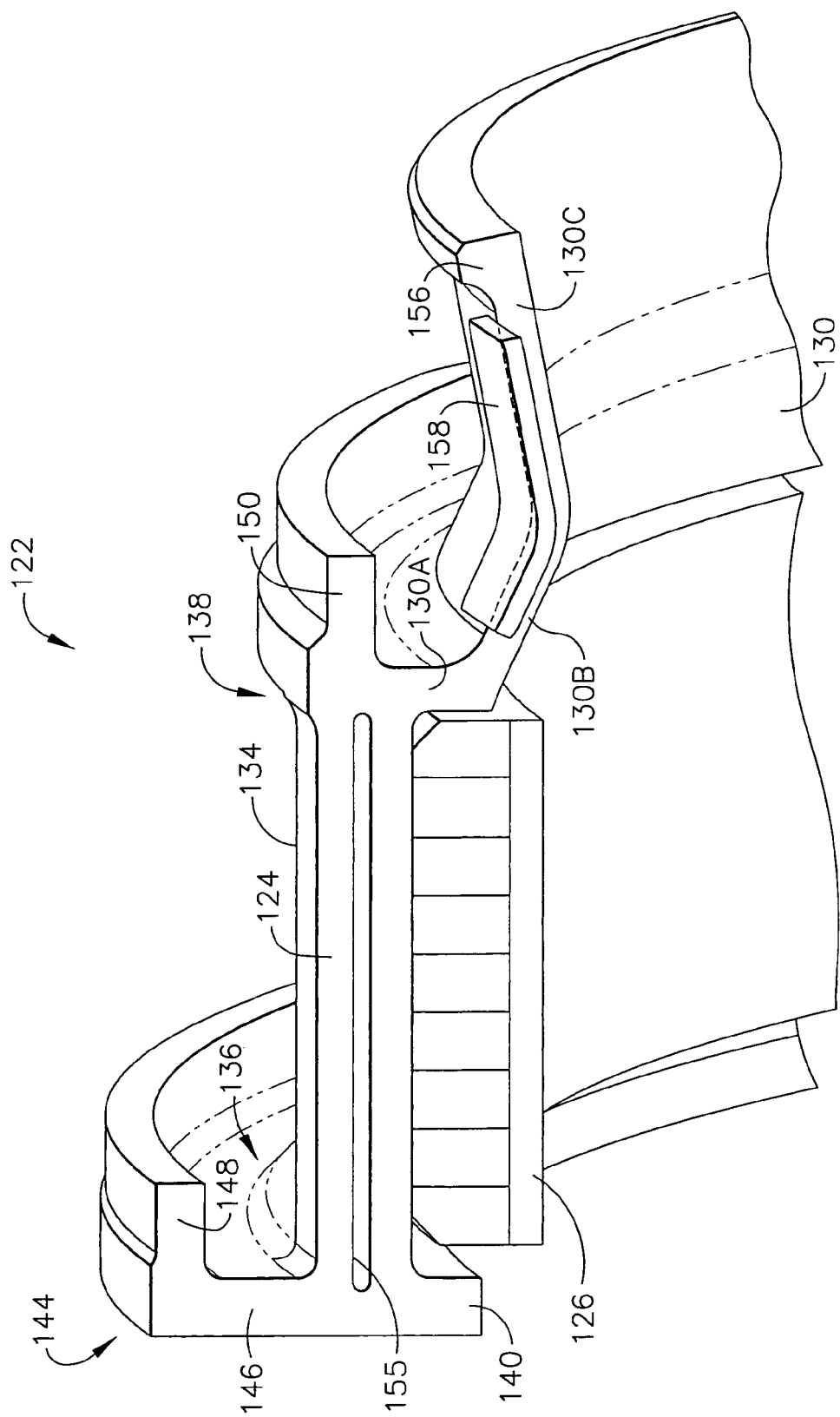
FIG. 4 is a partial perspective view of the shroud assembly shown in FIG. 2.
Figure 5:
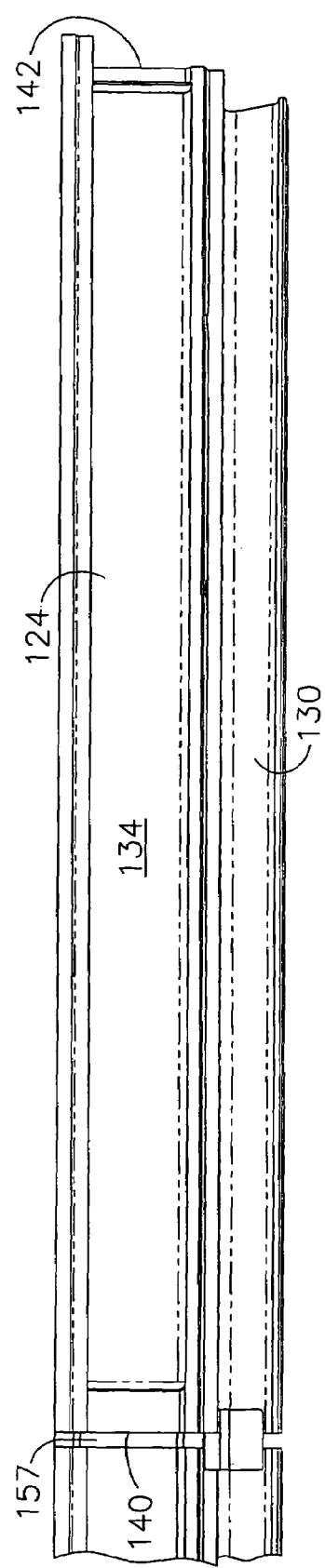
FIG. 5 is a view taken along lines 5—5 of FIG. 3.
Figure 6:
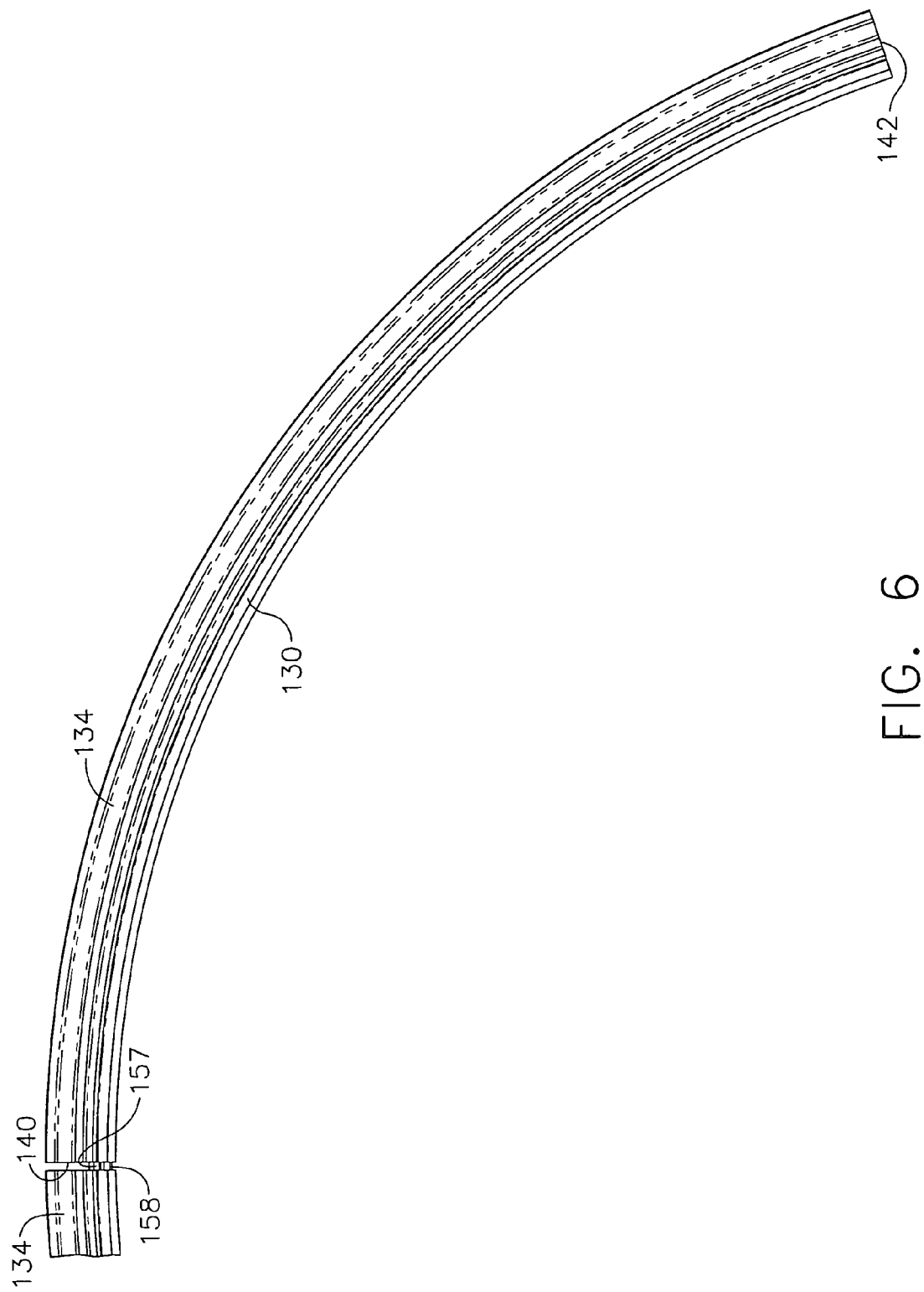
FIG. 6 is a view taken along lines 6—6 of FIG. 3.

The construction of the turbine shroud 122 is shown in more detail in FIGS. 4–6. The turbine shroud 122 is assembled from a circumferential array of arcuate segments 134, although it could also be formed as a continuous member. The segments 134 may be made from a high quality superalloy, such as a cobalt or nickel-based superalloy, and may be coated with a corrosion resistant material and/or thermal barrier coating. The base 124 has a forward end 136 and an aft end 138, and spaced-apart circumferential ends 140 and 142. A forward rail 144 having a radial leg 146 and an axial leg 148 is disposed at the forward end 136, and an aft rail 150 is disposed at the aft end 138. When assembled, the forward and aft rails 144 and 150 engage forward and aft hooks 152 and 154 of the TRF case 116, respectively (see FIG. 3). A longitudinal seal slot 155 is formed in each of the circumferential ends 140 and 142 of the base 124. The seal slot 155 accepts an end seal 157 (see FIG. 5) of a known type which reduces leakage between adjacent segments 134.

The extension member 130 protrudes from the aft end 138 of the base 124. In the illustrated example the extension member 130 has a radial portion 130A, an inwardly-angled, aft-extending portion 130B, and an outwardly-angled, aft extending portion 130C. A radially-outwardly extending lip 156 is disposed at its aft end. The exact configuration of the extension member 130 may be changed to suit a particular application.

Means are provided for sealing the gap between the extension members 130 of adjacent shroud segments 132. In the illustrated example an extension seal 158 comprises a tab-like seal body which is attached to one of the extension members 130 and protrudes circumferentially to form an overlapping or "ship-lap" seal arrangement with the adjacent extension member 130.

In operation, the extension member of the LPT shroud 122 provides protection of the TRF case 116 from impingement from the LPT exit stage blade tip bypass air. Because the turbine shroud 122 is segmented and typically constructed from a higher temperature capable material relative to the TRF 109, impingement of this bypass air on the segmented shroud extension members 130, as opposed to the TRF case 116, is of far less concern from a thermal gradient, thermal-mechanical fatigue, and overtemperature standpoint. The TRF case 116 is further protected from even local impingement of the blade tip bypass air by the extension seals 158 between adjacent extension members 130. This feature blocks any "line-of-sight" between the tip bypass flow and the TRF case 116.

The foregoing has described a turbine shroud and a turbine assembly incorporating the turbine shroud. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A shroud for a gas turbine engine, comprising:
   an arcuate body having spaced-apart forward and aft ends and spaced-apart circumferential ends;
   means for attaching said body to a surrounding case of said engine; and
   an arcuate extension member protruding rearward from said aft end of said body, said extension member including:
   a first portion which extends radially inwardly from said aft end of said body, and
   a second portion which extends axially aft and radially inwardly from a radially inner end of said first portion, said extension member having an inner surface adapted to define a portion of a gas flowpath through said engine.

2. The shroud of claim 1 wherein said extension member includes: a third portion which extends axially aft and radially inwardly from said second portion.

3. The shroud of claim 1 further comprising an abradable material disposed on an inner surface of said body.

4. The shroud of claim 1 further comprising a seal for preventing leakage between adjacent ones of said extension members.

5. The shroud of claim 4 wherein a seal is disposed on said extension member so as to overlap an adjacent extension member in a circumferential direction.

6. The shroud of claim 1 further comprising an end seal disposed between a first circumferential end of said shroud and a circumferential end of an adjacent shroud.

7. The shroud of claim 6 wherein said end seal is received in a longitudinal groove formed in said first circumferential end of said shroud.

8. The shroud of claim 1 wherein said body includes a first hook disposed at a forward end thereof and a second hook disposed an the said aft end, said first and second hooks adapted to engage respective complementary rails of said engine.

9. The shroud of claim 1 wherein said shroud comprises a nickel, cobalt, or steel-based superalloy.

10. A turbine assembly, comprising:
   a rotor which is rotatable about a longitudinal axis, said rotor carrying at least one stage comprising radially-extending turbine blades for interacting with a gas flowthrough said turbine;
   an annular first case, said first case having a first section which surrounds said turbine blades, and a second section disposed aft of said first section which defines a portion of a flowpath through said turbine;
   a turbine shroud disposed between said first case and said blades; comprising:
      an arcuate body having spaced-apart forward and aft ends and spaced-apart circumferential ends; and
      an arcuate extension member which protrudes rearward from said aft end of said body and extends from said aft end of said body to said second section of said first case, said extension member having an inner surface adapted to form a portion of a gas flowpath through said turbine; and
   an annular second case disposed axially forward of said first case and connected to said first case by a joint, wherein said joint is disposed at a location axially forward of said rotor.

11. The turbine assembly of claim 10 wherein said extension member of said turbine shroud includes:
   a first portion which extends radially inwardly from said aft end of said body, and
   a second portion which extends axially aft and radially inwardly from a radially inner end of said first portion.

12. The turbine assembly of claim 11 wherein said extension member of said turbine shroud includes: a third portion which extends axially aft and radially inwardly from said second portion.

13. The turbine assembly of claim 10 further comprising an abradable material disposed on an inner surface of said body of said turbine shroud.

14. The turbine assembly of claim 10 further comprising a seal for preventing leakage between adjacent ones of said extension members.

15. The turbine assembly of claim 14 wherein a seal is disposed on said extension member of said turbine shroud so as to overlap an adjacent extension member in a circumferential direction.

16. The turbine assembly of claim 10 further comprising an end seal disposed between a first circumferential end of said shroud and a circumferential end of an adjacent shroud.

17. The turbine assembly of claim 16 wherein said end seal is received in a longitudinal groove formed in said first circumferential end of said shroud.

18. The turbine assembly of claim 10 wherein said body of each of said shrouds includes a first hook disposed at a forward end thereof and a second hook disposed an the said aft end, said first and second hooks adapted to engage respective complementary rails of said first case.

19. The turbine assembly of claim 10 wherein said shroud comprises a nickel, cobalt, or steel-based superalloy.

* * * * *